(No Model.)
E. H. DANFORTH.
HORSE BLANKET FASTENER.
No. 473,916. Patented May 3, 1892.
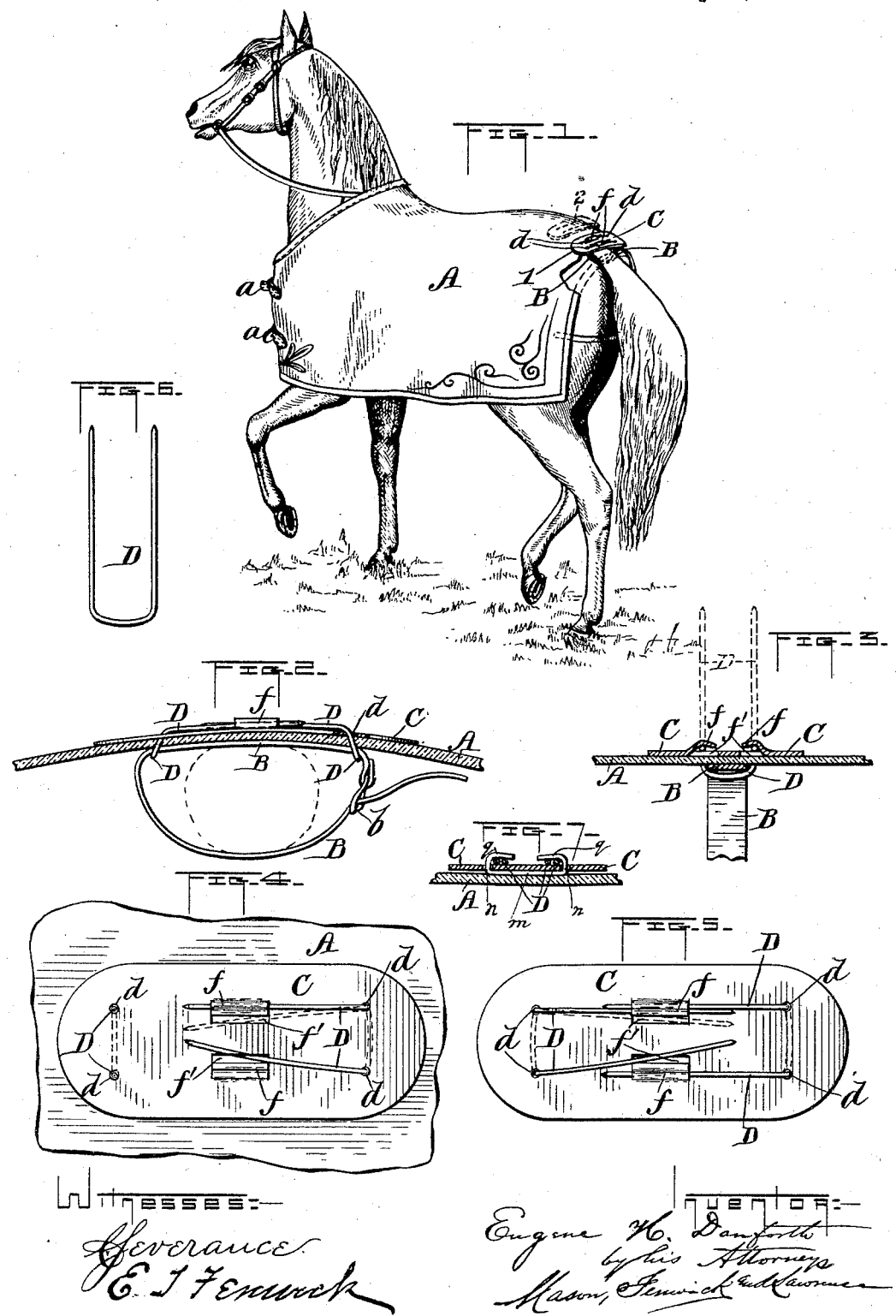

UNITED STATES PATENT OFFICE.

EUGENE H. DANFORTH, OF COLEBROOK, NEW HAMPSHIRE.

HORSE-BLANKET FASTENER.

SPECIFICATION forming part of Letters Patent No. 473,916, dated May 3, 1892.

Application filed January 12, 1892. Serial No. 417,829. (No model.)

*To all whom it may concern:*

Be it known that I, EUGENE H. DANFORTH, a citizen of the United States, residing at Colebrook, in the county of Coos and State of New Hampshire, have invented certain new and useful Improvements in a Combined Horse-Blanket and Adjustable Crupper-Strap and Fastener Therefor; and I do hereby declare the following to be a full, clear, and exact description of the invention, such as will enable others skilled in the art to which it appertains to make and use the same.

My invention consists in an improved adjustable crupper-strap as an adjunct of a horse-blanket, and also in an improved construction of the fastening means for the adjustable crupper and other adjustable straps.

The object of my invention is to improve crupper-straps which are attached to blankets for horses by providing for the adjustability of the crupper-strap on the blanket, so that the same blanket may be used on either a large or small horse and the crupper-strap in either case still be comfortably and securely fastened under the tail of the horse; and another object is to facilitate the manipulation in unfastening, adjusting, and refastening of the means by which the crupper-strap is confined upon the blanket whenever it is desired to set said confining means farther forward or farther backward on the blanket, accordingly as the horse is small or large, and thus bring the crupper-strap in the right relation to the horse's tail.

In the accompanying drawings, Figure 1 is a perspective view of a horse-blanket applied on a horse and having my improved adjustable crupper-strap and the means for fastening it to the blanket applied thereto. Fig. 2 is a section of a portion of a blanket in the line of the lesser length of the keeper-plate and a broken section in the line of the greater length of the keeper-plate to which the staple-fastenings are applied, said staples and the crupper-strap being shown in elevation and the latter as adjusted under the horse's tail, the tail being illustrated by a dotted circular line. Fig. 3 is a vertical section on the line $x\ x$ of the keeper-plate and the fastening-staples applied to the blanket and crupper-strap as they appear before the first bending operation of the staple-fastenings is performed. Fig. 4 is a top view illustrating the manner in which the second operation of bending the staple-fastenings is performed, one of the fastening-staples being shown in the condition illustrated by dotted lines in Fig. 3, while the other is shown bent down in oblique line to a horizontal position, one branch of the bent staple being bent or sprung under its keeper-lug, while the other is not yet so sprung under its keeper-lug. Fig. 5 is a top view of the keeper-plate and the fastening-staples, both staple-fastenings being bent down, and one leg or prong of each sprung under a keeper-lug on one side of the center thereof and one leg or prong of one under a keeper-lug and a leg or prong of the other outside its keeper-lug, ready to be bent or sprung under it on the other side of the center of the keeper-plate. Fig. 6 is a detail view of one of the staple-fastenings, and Fig. 7 a modification.

A in the drawings indicates an ordinary horse-blanket provided, as usual, with buckling or fastening means, as $a\ a$, whereby to secure it upon the chest of the horse.

B is a crupper-strap provided, as usual, with a buckling means $b$. This strap passes under the horse's tail and is applied underneath and connected to the blanket A by means of a long thin metal keeper-plate C, which is applied on top of the blanket and is preferably of oval shape, and two pliable or flexible pointed staple-fastenings D D in the following manner: The plate is stamped out so as to leave two pairs of staple-prong holes $d\ d$, one pair near one end and the other pair near the other end of the plate, and two raised keeper-lugs $f\ f$. The lugs $f$ partially overhang long openings $f'\ f'$ cut into the plate in the act of forming the lugs, and they are attached at their outer edges or sides to the plate, while they are free at their inner sides or edges, said inner edges standing up some distance above the plate C, so as to allow of the legs or prongs of the staples being sprung or bent under the lugs $f$.

The staples D D are of U form with pointed or needle-like ends and are made of tough flexible or pliable metal, and their legs or prongs by being sharp are adapted to be readily passed through the blanket as well as the holes $d$ of the plate, as illustrated in the drawings. When the strap is to be attached to the blanket, either at the point indicated by full black lines 1 or at the point indicated by the dotted lines 2, or when it is to be adjusted on the blanket from the position No. 1 to the position No. 2, or vice versa, the staples (which are supposed to be out in either case) are passed through the blanket and the plate, as indicated by dotted lines in Fig. 3, the strap is slipped through the bowed portions of the staples beneath the blanket and the plate C, and then the staples are bent down on oblique lines toward center of the plate to a plane below the keeper-lugs and sprung or bent to a position to bring them under said lugs, as illustrated in the drawings, and thus the strap B is securely confined to the plate C and the plate to the blanket A. If the crupper-strap is found too tight or too loose after being buckled around the horse's tail by reason of being too far forward or too far back on the blanket, the legs or prongs of the staples can readily be bent or sprung from under the keeper-lugs of the plate, turned up to their original shape, (shown by dotted lines in Fig. 3,) and the staples withdrawn from the blanket and plate, and the plate set farther back or farther forward on the blanket and it and the crupper-strap readily refastened by manipulating the staples in the manner described and illustrated.

The within-described crupper-strap fastener may be found useful and convenient for various purposes where an adjustable strap connection is necessary.

It might be practicable, although not desirable in my judgment, to stamp or cut two holes in the plate C, where the keeper-lugs are constructed, and to pass up the prongs $n$ of a bowed or doubled pronged staple $m$ through these holes, so that the bowed portions run across the plate between the blanket and are bent down a little below lines parallel with the top surface of the plate and made to form two keeper-lugs $q$ open on their inner sides, as illustrated in Fig. 7; but the best and cheapest and most enduring construction is that of having the lugs formed integral with the plate, as represented in the drawings.

My crupper-strap, fastened as described, while serving, in connection with the front fastenings of the blanket, all the purposes of a surcingle and rendering the services of a surcingle unnecessary for keeping the blanket on the horse, is at the same time adjustable and adapted for horses of different sizes.

What I claim as my invention is—

1. In a horse-blanket holder, a detachable crupper-strap and a fastening device, comprising a keeper-plate provided with staple-keepers, and staples passing through said plate and adapted to secure said crupper-strap adjustably to a horse-blanket, substantially as and for the purpose described.

2. The combination of the plate formed with elevated open-sided keeper-lugs and staple-holes, the flexible or pliable staples passed through the holes and adapted to be bent or sprung under the keeper-lugs, and a strap passed through the bowed portions of the staples beneath the plate, substantially as described.

3. The keeper-plate having elevated open-sided lugs stamped upon it so as to stand above its upper side and with holes through it near each end, in combination with U-shaped flexible or pliable penetrating staples fastened to the plate by bending and springing them under the lugs, substantially as described.

In testimony whereof I hereunto affix my signature in presence of two witnesses.

EUGENE H. DANFORTH.

Witnesses:
JAMES I. PARSONS,
JOHN W. DREW.